(12) United States Patent
Huang et al.

(10) Patent No.: US 11,427,676 B2
(45) Date of Patent: Aug. 30, 2022

(54) ALIPHATIC POLYESTER WITH HIGH ELONGATION

(71) Applicant: CHANG CHUN PLASTICS CO., LTD., Taipei (TW)

(72) Inventors: Ching-Jui Huang, Taipei (TW); Ping-Chieh Wang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 16/826,880

(22) Filed: Mar. 23, 2020

(65) Prior Publication Data

US 2021/0206914 A1 Jul. 8, 2021

(30) Foreign Application Priority Data

Jan. 2, 2020 (TW) ................. 109100054

(51) Int. Cl.
*C08G 63/20* (2006.01)
*C08G 63/16* (2006.01)
*C08L 67/02* (2006.01)
*C08G 63/676* (2006.01)

(52) U.S. Cl.
CPC ............. *C08G 63/20* (2013.01); *C08G 63/16* (2013.01); *C08L 67/02* (2013.01); *C08G 63/676* (2013.01)

(58) Field of Classification Search
CPC .......... C08G 63/16; C08G 63/20; C08L 67/02
See application file for complete search history.

(56) References Cited

U.S. PATENT DOCUMENTS

| 5,714,569 | A | 2/1998 | Imaizumi et al. | |
| 2005/0059795 | A1 | 3/2005 | Bastioli et al. | |
| 2010/0305297 | A1* | 12/2010 | Hoshino | C08G 63/785 528/296 |
| 2012/0277400 | A1 | 11/2012 | Chen et al. | |
| 2013/0066038 | A1 | 3/2013 | Hoshino et al. | |
| 2013/0214455 | A1 | 8/2013 | Siegenthaler et al. | |

FOREIGN PATENT DOCUMENTS

| CN | 107257814 | 10/2017 |
| EP | 1 640 397 | 3/2006 |
| JP | 2014-185331 A | 10/2014 |
| TW | 303375 | 4/1997 |
| TW | I277625 | 4/2007 |
| TW | I443124 | 7/2014 |
| WO | 2016/108768 | 7/2016 |

OTHER PUBLICATIONS

Hu et al., Industrial & Engineering Chemistry Research, 2010, vol. 49, p. 10876-10882.*
Nature, "Synthesis of Citric Acid", 1880, p. 585-586.*
European Search Report of International Application No. EP 20214262 dated May 14, 2021.

* cited by examiner

*Primary Examiner* — Robert S Jones, Jr.
(74) *Attorney, Agent, or Firm* — Ping Wang; Rimon Law

(57) ABSTRACT

An aliphatic polyester is provided. The aliphatic polyester comprises:
a first structural unit represented by

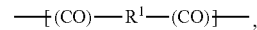

wherein $R^1$ is absent or a C1 to C40 aliphatic hydrocarbyl;
a second structural unit represented by

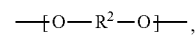

wherein $R^2$ is a C1 to C10 aliphatic hydrocarbyl; and
a third structural unit derived from a first cross-linking agent, wherein the first cross-linking agent has three reactive functional groups, wherein at least one reactive functional group is a secondary or tertiary hydroxyl, with the proviso that the first cross-linking agent is not malic acid.

6 Claims, No Drawings

ALIPHATIC POLYESTER WITH HIGH ELONGATION

This application claims the benefit of Taiwan Patent Application No. 109100054 filed on Jan. 2, 2020, the subject matters of which are incorporated herein in their entirety by reference.

FIELD

The present invention provides an aliphatic polyester, which is biodegradable and has high elongation. The aliphatic polyester is especially suitable for use as a disposable packaging material.

BACKGROUND

Polyethylene, polystyrene, polypropylene and polyvinyl chloride are extensively used in various fields, such as food packaging, construction and household electrical appliance fields. However, those polymer materials are not biodegradable and therefore are pollutants to the environment. Research on biodegradable polymers is attracting attention due to the increasing environmental awareness of the public.

Biodegradable polymers can degrade into low molecular compounds in an extremely short period of time by means of the microorganisms in the environment and then degrade into water and carbon dioxide, and thus, their damage to the environment can be significantly decreased. Polyester, for example, is one of the widely studied biodegradable polymers. However, biodegradable polymers usually have low mechanical strength and elongation. Though a chain extender may be added during the manufacturing process to improve the mechanical strength of the manufactured biodegradable polymer, the addition of the chain extender will make the manufacturing process more difficult and deteriorate the biodegradability of the manufactured biodegradable polymer.

SUMMARY OF THE INVENTION

In view of the aforementioned technical problems, the present invention provides an aliphatic polyester, which comprises structural units derived from specific cross-linking agents. The aliphatic polyester of the present invention is biodegradable and has good mechanical strength, elongation and clarity.

Thus, an objective of the present invention is to provide an aliphatic polyester, which comprises the following structural units:

a first structural unit represented by

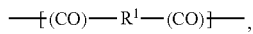

wherein $R^1$ is absent or a C1 to C40 aliphatic hydrocarbyl;
a second structural unit represented by

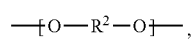

wherein $R^2$ is a C1 to C10 aliphatic hydrocarbyl; and
a third structural unit derived from a first cross-linking agent, wherein the first cross-linking agent has three reactive functional groups, wherein at least one reactive functional group of the first cross-linking agent is a secondary or tertiary hydroxyl, with the proviso that the first cross-linking agent is not malic acid.

In some embodiments of the present invention, the first cross-linking agent is a C3 to C20 aliphatic alcohol or a C3 to C20 aliphatic alcohol acid.

In some embodiments of the present invention, the first cross-linking agent is selected from the group consisting of 1,2,4-butanetriol, 2-methyl-1,2,3-propanetriol, glycerol, 3-hydroxyglutaric acid, citramalic acid, tartronic acid, 3,18-dihydroxymethylenestearic acid, and 3-hydroxyoctadecanedioic acid.

In some embodiments of the present invention, the third structural unit is selected from the group consisting of

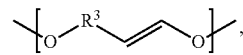

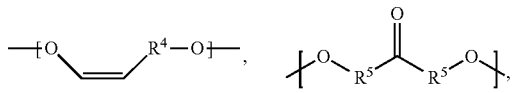

and combinations thereof, wherein $R^3$, $R^4$ and $R^5$ are independently a C1 to C10 aliphatic hydrocarbyl.

In some embodiments of the present invention, the molar ratio of the third structural unit to the first structural unit is less than 0.4:100.

In some embodiments of the present invention, the aliphatic polyester further comprises a fourth structural unit derived from a second cross-linking agent, wherein the second cross-linking agent has three reactive functional groups, wherein at least one reactive functional group of the second cross-linking agent is a secondary or tertiary hydroxyl, with the proviso that the second cross-linking agent is different from the first cross-linking agent.

In some embodiments of the present invention, the second cross-linking agent is a C3 to C20 aliphatic alcohol or a C3 to C20 aliphatic alcohol acid.

In some embodiments of the present invention, the second cross-linking agent is selected from the group consisting of 1,2,4-butanetriol, 2-methyl-1,2,3-propanetriol, glycerol, 3-hydroxyglutaric acid, malic acid, citramalic acid, tartronic acid, 3,18-dihydroxymethylenestearic acid, 3-hydroxyoctadecanedioic acid, and combinations thereof.

In some embodiments of the present invention, the fourth structural unit is selected from the group consisting of

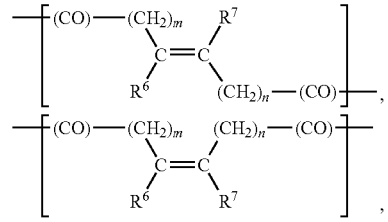

and a combination thereof, wherein m and n are independently an integer ranging from 0 to 18, and $R^6$ and $R^7$ are independently a hydrogen atom or a C1 to C18 aliphatic hydrocarbyl.

In some embodiments of the present invention, the molar ratio of the third structural unit to the fourth structural unit ranges from 1:8 to 8:1.

In some embodiments of the present invention, the molar ratio of the total amount of the third structural unit and the fourth structural unit to the amount of the first structural unit is not more than 0.4:100.

In some embodiments of the present invention, $R^1$ is absent or a C1 to C6 aliphatic hydrocarbyl, and $R^2$ is a C1 to C6 aliphatic hydrocarbyl.

In some embodiments of the present invention, the first structural unit is derived from succinic acid, adipic acid, oxalic acid, malonic acid, glutaric acid, octanedioic acid, decanedioic acid, dodecanedioic acid, C36 dimer acid, cyclohexanedicarboxylic acid, or any combination thereof; and the second structural unit is derived from ethylene glycol, 1,4-butanediol, neopentyl glycol, 1,6-hexanediol, 1,10-decanediol, 1,4-cyclohexanedimethanol, or any combination thereof.

To render the above objectives, technical features and advantages of the present invention more apparent, the present invention will be described in detail with reference to some embodiments hereinafter.

DESCRIPTION OF THE PREFERRED EMBODIMENTS

Hereinafter, some embodiments of the present invention will be described in detail. However, without departing from the spirit of the present invention, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not intended to indicate any priority.

Unless it is additionally explained, the examples of reactive functional groups recited in the specification and the claims should include all isomeric forms thereof. For example, butenyl includes 1-butenyl, 2-butenyl, and 3-butenyl.

The present invention provides an aliphatic polyester, which is biodegradable and has good mechanical strength, elongation and clarity. The aliphatic polyester of the present invention and the applications thereof are described in detail below.

1. ALIPHATIC POLYESTER

As further described below, the aliphatic polyester of the present invention comprises a first structural unit, a second structural unit, and a third structural unit, and may further comprise other structural units (e.g., a fourth structural unit).

1.1. First Structural Unit

The first structural unit is derived from an aliphatic dicarboxylic acid and is represented by

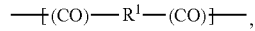

wherein $R^1$ is absent or a C1 to C40 aliphatic hydrocarbyl. It is preferred that $R^1$ is absent or a C1 to C6 aliphatic hydrocarbyl. Examples of the C1 to C40 aliphatic hydrocarbyl include but are not limited to a C1 to C40 alkyl, a C3 to C40 cycloalkyl, and a C2 to C40 alkenyl.

Examples of the C1 to C40 alkyl include but are not limited to methyl, ethyl, n-propyl, isopropyl, n-butyl, isobutyl, sec-butyl, tert-butyl, n-pentyl, isopentyl, tert-pentyl, neopentyl, n-hexyl, isohexyl, sec-hexyl, tert-hexyl, neohexyl, n-heptyl, isoheptyl, n-octyl, isooctyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, isoheptadecyl, n-octadecyl, isooctadecyl, n-nonadecyl, isononadecyl, n-eicosyl, isoeicosyl, n-heneicosyl, isoheneicosyl, n-docosyl, isodocosyl, n-tricosyl, isotricosyl, n-tetracosyl, isotetracosyl, n-pentacosyl, isopentacosyl, n-hexacosyl, isohexacosyl, n-heptacosyl, isoheptacosyl, n-octacosyl, isooctacosyl, n-nonacosyl, isononacosyl, n-triacontyl, isotriacontyl, n-hentriacontyl, isohentriacontyl, n-dotriacontyl, isodotriacontyl, n-tritriacontyl, isotritriacontyl, n-tetratriacontyl, isotetratriacontyl, n-pentatriacontyl, isopentatriacontyl, n-hexatriacontyl, isohexatriacontyl, n-heptatriacontyl, isoheptatriacontyl, n-octatriacontyl, isooctatriacontyl, n-nonatriacontyl, isononatriacontyl, n-tetracontyl, and isotetracontyl.

Examples of the C3 to C40 cycloalkyl include but are not limited to cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, cycloheneicosyl, cyclodocosyl, cyclotricosyl, cyclotetracosyl, cyclopentacosyl, cyclohexacosyl, cycloheptacosyl, cyclooctacosyl, cyclononacosyl, cyclotriacontyl, methylcyclopropyl, methylcyclobutyl, methylcyclopentyl, methylcyclohexyl, methylcycloheptyl, methylcyclooctyl, methylcyclononyl, methylcyclodecyl, dimethylcyclopropyl, dimethylcyclobutyl, dimethylcyclopentyl, dimethylcyclohexyl, dimethylcycloheptyl, dimethylcyclooctyl, dimethylcyclononyl, dimethylcyclodecyl, ethylcyclopropyl, ethylcyclobutyl, ethylcyclopentyl, ethylcyclohexyl, ethylcycloheptyl, ethylcyclooctyl, ethylcyclononyl, ethylcyclodecyl, diethylcyclopropyl, diethylcyclobutyl, diethylcyclopentyl, diethylcyclohexyl, diethylcycloheptyl, diethylcyclooctyl, diethylcyclononyl, and diethylcyclodecyl.

Examples of the C2 to C40 alkenyl include but are not limited to ethenyl, propenyl, allyl, n-butenyl, isobutenyl, n-pentenyl, isopentenyl, n-hexenyl, isohexenyl, n-heptenyl, isoheptenyl, n-octenyl, isooctenyl, n-nonenyl, isononenyl, n-decenyl, isodecenyl, n-undecenyl, isoundecenyl, n-dodecenyl, isododecenyl, n-tridecenyl, isotridecenyl, n-tetradecenyl, isotetradecenyl, n-pentadecenyl, isopentadecenyl, n-hexadecenyl, isohexadecenyl, n-heptadecenyl, isoheptadecenyl, n-octadecenyl, isooctadecenyl, n-nonadecenyl, isononadecenyl, n-eicosenyl, isoeicosenyl, n-heneicosenyl, isoheneicosenyl, n-docosenyl, isodocosenyl, n-tricosenyl, isotricosenyl, n-tetracosenyl, isotetracosenyl, n-pentacosenyl, isopentacosenyl, n-hexacosenyl, isohexacosenyl, n-heptacosenyl, isoheptacosenyl, n-octacosenyl, isooctacosenyl, n-nonacosenyl, isononacosenyl, n-triacontenyl, isotriacontenyl, n-hentriacontenyl, isohentriacontenyl, n-dotriacontenyl, isodotriacontenyl, n-tritriacontenyl, isotritriacontenyl, n-tetratriacontenyl, isotetratriacontenyl, n-pentatriacontenyl, isopentatriacontenyl, n-hexatriacontenyl, isohexatriacontenyl, n-heptatriacontenyl, isoheptatriacontenyl, n-octatriacontenyl, isooctatriacontenyl, n-nonatriacontenyl, isononatriacontenyl, n-tetracontenyl, isotetracontenyl, propadienyl, butadienyl, pentadienyl, hexadienyl, heptadienyl, octadienyl, nonadienyl, decadienyl, undecadienyl, dodecadienyl, tridecadienyl, tetradecadienyl, pentadecadienyl, hexadecadienyl, heptadecadienyl, octadecadienyl, nonadecadienyl, eicosadienyl, heneicosadienyl, docosadienyl, tricosadienyl, tetracosadienyl, pentacosadienyl, hexacosadienyl, heptacosadienyl, octacosadienyl, nonacosadienyl, triacontadienyl, hentriacontadienyl, dotriacontadienyl, tritriacontadienyl, tetratriacontadienyl, pentatriacontadienyl, hexatriacontadienyl, heptatriacontadienyl, octatriacontadienyl, nonatriacontadienyl, tetracontadienyl, and 9-[(Z)-non-3-enyl]-10-octylnonadecanyl.

In some embodiments of the present invention, the first structural unit is derived from one or more of succinic acid, adipic acid, oxalic acid, malonic acid, glutaric acid, octanedioic acid, decanedioic acid, dodecanedioic acid, C36 dimer acid, and cyclohexanedicarboxylic acid.

1.2. Second Structural Unit

The second structural unit is derived from an aliphatic diol and is represented by

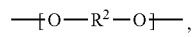

wherein $R^2$ is a C1 to C10 aliphatic hydrocarbyl. It is preferred that $R^2$ is a C1 to C6 aliphatic hydrocarbyl. Examples of the C1 to C10 aliphatic hydrocarbyl include but are not limited to a C1 to C10 alkyl, a C3 to C10 cycloalkyl, and a C2 to C10 alkenyl. Examples of the C1 to C10 alkyl include alkyls with carbon number ranging from 1 (one) to 10 as recited in the aforementioned examples of the C1 to C40 alkyl. Examples of the C3 to C10 cycloalkyl include cycloalkyls with carbon number ranging from 3 to 10 as recited in the aforementioned examples of the C3 to C40 cycloalkyl. Examples of the C2 to C10 alkenyl include alkenyls with carbon number ranging from 2 to 10 as recited in the aforementioned examples of the C2 to C40 alkenyl.

In some embodiments of the present invention, the second structural unit is derived from one or more of ethylene glycol, 1,4-butanediol, neopentyl glycol, 1,6-hexanediol, 1,10-decanediol, and 1,4-cyclohexanedimethanol.

In the aliphatic polyester of the present invention, based on the total moles of all structural units, the total amount of the first structural unit and second structural unit is 90 mol % or more, and preferably ranges from 95 mol % to 99.8 mol %, such as 95.1 mol %, 95.2 mol %, 95.3 mol %, 95.4 mol %, 95.5 mol %, 95.6 mol %, 95.7 mol %, 95.8 mol %, 95.9 mol %, 96 mol %, 96.1 mol %, 96.2 mol %, 96.3 mol %, 96.4 mol %, 96.5 mol %, 96.6 mol %, 96.7 mol %, 96.8 mol %, 96.9 mol %, 97 mol %, 97.1 mol %, 97.2 mol %, 97.3 mol %, 97.4 mol %, 97.5 mol %, 97.6 mol %, 97.7 mol %, 97.8 mol %, 97.9 mol %, 98 mol %, 98.1 mol %, 98.2 mol %, 98.3 mol %, 98.4 mol %, 98.5 mol %, 98.6 mol %, 98.7 mol %, 98.8 mol %, 98.9 mol %, 99 mol %, 99.1 mol %, 99.2 mol %, 99.3 mol %, 99.4 mol %, 99.5 mol %, 99.6 mol %, or 99.7 mol %.

1.3. Third Structural Unit

The third structural unit is derived from a first cross-linking agent. The first cross-linking agent has three reactive functional groups, wherein at least one reactive functional group of the first cross-linking agent is a secondary or tertiary hydroxyl, with the proviso that the first cross-linking agent is not malic acid. The secondary hydroxyl means that the carbon atom to which the hydroxyl bonds is a secondary carbon. The tertiary hydroxyl means that the carbon atom to which the hydroxyl bonds is a tertiary carbon. Without being restricted by any theories, it is believed that the first cross-linking agent with at least one secondary or tertiary hydroxyl allows the polymerization reaction to primarily be carried out linearly because primary hydroxyls are more reactive to secondary or tertiary hydroxyls. This results in an aliphatic polyester polymer with a longer main chain and shorter branched chains and thus, with better elongation property. In consideration of the clarity of the aliphatic polyester, it is preferred that the first cross-linking agent does not comprise any reactive functional group which is not carboxyl or hydroxyl, such as amino, cyano, or nitro. That is, the reactive functional group of the first cross-linking agent which is not a secondary or tertiary hydroxyl is preferably a carboxyl or hydroxyl.

The first cross-linking agent may be selected from a C3 to C20 aliphatic alcohol and a C3 to C20 aliphatic alcohol acid, and preferably selected from a C3 to C18 aliphatic alcohol and a C3 to C18 aliphatic alcohol acid. However, the present invention is not limited thereto.

Examples of the C3 to C18 aliphatic alcohol that can be used as the first cross-linking agent include but are not limited to glycerol, 1,2,4-butanetriol, 1,2,3-butanetriol, 1,2,5-pentanetriol, 1,2,4-pentanetriol, 1,2,3-pentanetriol, 2,3,4-pentanetriol, 1,3,5-pentanetriol, 1,2,6-hexanetriol, 1,2,5-hexanetriol, 1,2,4-hexanetriol, 1,2,3-hexanetriol, 1,3,6-hexanetriol, 1,3,5-hexanetriol, 1,3,4-hexanetriol, 1,4,5-hexanetriol, 2,3,4-hexanetriol, 2,3,5-hexanetriol, 2-methyl-1,2,3-propanetriol, 3-methyl-1,3,5-pentanetriol, 3-methyl-1,3,6-hexanetriol, 1,4,7-heptanetriol, 1,3,5-heptanetriol, 1,2,7-heptanetriol, 1,2,6-heptanetriol, 1,2,3-heptanetriol, 2,4,6-heptanetriol, and 2-methyl-2,3,6-heptanetriol.

Examples of the C3 to C18 aliphatic alcohol acid that can be used as the first cross-linking agent include but are not limited to tartronic acid, methyltartronic acid, citramalic acid, 3-hydroxyglutaric acid, 3-hydroxy-3-methylglutaric acid, 2-hydroxy adipic acid, 3-hydroxy adipic acid, 2-hydroxy heptanedioic acid, 3-hydroxy heptanedioic acid, 4-hydroxy heptanedioic acid, 2-hydroxy suberic acid, 3-hydroxy suberic acid, 2-hydroxynonanedioic acid, 4-hydroxynonanedioic acid, 2-hydroxydecanedioic acid, 3-hydroxydecanedioic acid, 3,18-dihydroxymethylenestearic acid, and 3-hydroxyoctadecanedioic acid.

In some embodiments of the present invention, the first cross-linking agent is selected from the group consisting of 1,2,4-butanetriol, 2-methyl-1,2,3-propanetriol, glycerol, 3-hydroxyglutaric acid, citramalic acid, tartronic acid, 3,18-dihydroxymethylenestearic acid, and 3-hydroxyoctadecanedioic acid.

In some embodiments of the present invention, the third structural unit derived from the first cross-linking agent is selected from the group consisting of

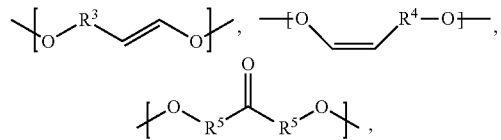

and combinations thereof, wherein $R^3$, $R^4$ and $R^5$ are independently a C1 to C10 aliphatic hydrocarbyl. Descriptions for the C1 to C10 aliphatic hydrocarbyl have been provided in the above. For example, the embodiment in which $R^3$, $R^4$ and $R^5$ in the third structural unit are methyl may correspond to the condition in which the first cross-linking agent is glycerol. The embodiment in which $R^3$ and $R^4$ in the third structural unit are ethyl may correspond to the condition in which the first cross-linking agent is 1,2,4-butanetriol.

In the aliphatic polyester of the present invention, the molar ratio of the third structural unit to the first structural unit is preferably less than 0.4:100, such as 0.39:100, 0.38:100, 0.37:100, 0.36:100, 0.35:100, 0.34:100, 0.33:100, 0.32:100, 0.31:100, 0.3:100, 0.29:100, 0.28:100, 0.27:100, 0.26:100, 0.25:100, 0.24:100, 0.23:100, 0.22:100, 0.21:100, 0.2:100, 0.19:100, 0.18:100, 0.17:100, 0.16:100, 0.15:100, 0.14:100, 0.13:100, 0.12:100, 0.11:100, 0.1:100, 0.09:100, 0.08:100, 0.07:100, 0.06:100, 0.05:100, 0.04:100, 0.03:100, 0.02:100, or 0.01:100. When the molar ratio of the third structural unit to the first structural unit is within the above ranges, the elongation property of the aliphatic polyester is better.

1.4. Fourth Structural Unit

In the preferred embodiments of the present invention, the aliphatic polyester of the present invention further comprises a fourth structural unit derived from a second cross-linking agent in addition to the first structural unit, second structural unit and third structural unit. It was found that introducing the second cross-linking agent can make different polymerization reactions occur alternately and thus, increase the length of the main chain of the polymer, thereby, further improving the elongation property of the aliphatic polyester. The second cross-linking agent is different from the first cross-linking agent and has three reactive functional groups, wherein at least one reactive functional group of the second cross-linking agent is a secondary or tertiary hydroxyl. In consideration of the clarity of the aliphatic polyester, it is preferred that the second cross-linking agent does not comprise any reactive functional group which is not carboxyl or hydroxyl, such as amino, cyano, or nitro. That is, the reactive functional group of the second cross-linking agent which is not a secondary or tertiary hydroxyl is preferably a carboxyl or hydroxyl.

The second cross-linking agent may be selected from a C3 to C20 aliphatic alcohol and a C3 to C20 aliphatic alcohol acid, and preferably selected from a C3 to C18 aliphatic alcohol and a C3 to C18 aliphatic alcohol acid. However, the present invention is not limited thereto.

Examples of the C3 to C18 aliphatic alcohol that can be used as the second cross-linking agent include but are not limited to glycerol, 1,2,4-butanetriol, 1,2,3-butanetriol, 1,2,5-pentanetriol, 1,2,4-pentanetriol, 1,2,3-pentanetriol, 2,3,4-pentanetriol, 1,3,5-pentanetriol, 1,2,6-hexanetriol, 1,2,5-hexanetriol, 1,2,4-hexanetriol, 1,2,3-hexanetriol, 1,3,6-hexanetriol, 1,3,5-hexanetriol, 1,3,4-hexanetriol, 1,4,5-hexanetriol, 2,3,4-hexanetriol, 2,3,5-hexanetriol, 2-methyl-1,2,3-propanetriol, 3-methyl-1,3,5-pentanetriol, 3-methyl-1,3,6-hexanetriol, 1,4,7-heptanetriol, 1,3,5-heptanetriol, 1,2,7-heptanetriol, 1,2,6-heptanetriol, 1,2,3-heptanetriol, 2,4,6-heptanetriol, and 2-methyl-2,3,6-heptanetriol.

Examples of the C3 to C18 aliphatic alcohol acid that can be used as the second cross-linking agent include but are not limited to malic acid, tartronic acid, methyltartronic acid, citramalic acid, 3-hydroxyglutaric acid, 3-hydroxy-3-methylglutaric acid, 2-hydroxy adipic acid, 3-hydroxy adipic acid, 2-hydroxy heptanedioic acid, 3-hydroxy heptanedioic acid, 4-hydroxy heptanedioic acid, 2-hydroxy suberic acid, 3-hydroxy suberic acid, 2-hydroxynonanedioic acid, 4-hydroxynonanedioic acid, 2-hydroxydecanedioic acid, 3-hydroxydecanedioic acid, 3,18-dihydroxymethylenestearic acid, and 3-hydroxyoctadecanedioic acid.

In some embodiments of the present invention, the fourth structural unit is selected from the group consisting of

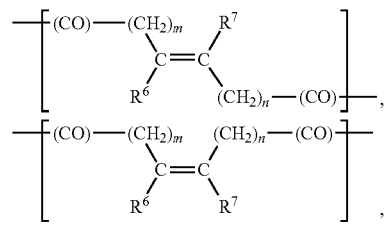

and a combination thereof, wherein m and n are independently an integer ranging from 0 to 18, and $R^6$ and $R^7$ are independently a hydrogen atom or a C1 to C18 hydrocarbyl. Examples of the C1 to C18 hydrocarbyl include but are not limited to a C1 to C18 alkyl, a C3 to C18 cycloalkyl, and a C2 to C18 alkenyl. Examples of the C1 to C18 alkyl include alkyls with carbon number ranging from 1 (one) to 18 as recited in the aforementioned examples of the C1 to C40 alkyl. Examples of the C3 to C18 cycloalkyl include cycloalkyls with carbon number ranging from 3 to 18 as recited in the aforementioned examples of the C3 to C40 cycloalkyl. Examples of the C2 to C18 alkenyl include alkenyls with carbon number ranging from 2 to 18 as recited in the aforementioned examples of the C2 to C40 alkenyl. For example, the embodiment in which m and n in the fourth structural unit are 0 and $R^6$ and $R^7$ in the fourth structural unit are hydrogen atoms may correspond to the condition in which the second cross-linking agent is malic acid.

It was found that when malic acid is used alone as a cross-linking agent, the clarity of the aliphatic polyester became worse. Therefore, in the present invention, malic acid is used as the second cross-linking agent rather than the first cross-linking agent.

In the aliphatic polyester of the present invention, the molar ratio of the third structural unit to the fourth structural unit preferably ranges from 1:8 to 8:1, such as 1:7.5, 1:7, 1:6.5, 1:6, 1:5.5, 1:5, 1:4.5, 1:4, 1:3.5, 1:3, 1:2.5, 1:2, 1:1.5, 1:1, 1.5:1, 2:1, 2.5:1, 3:1, 3.5:1, 4:1, 4.5:1, 5:1, 5.5:1, 6:1, 6.5:1, 7:1, or 7.5:1, and more preferably ranges from 1:3 to 3:1, such as 1:2.9, 1:2.8, 1:2.7, 1:2.6, 1:2.5, 1:2.4, 1:2.3, 1:2.2, 1:2.1, 1:2, 1:1.9, 1:1.8, 1:1.7, 1:1.6, 1:1.5, 1:1.4, 1:1.3, 1:1.2, 1:1.1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, or 2.9:1. When the molar ratio of the third structural unit to the fourth structural unit is within the above ranges, the aliphatic polyester has better elongation.

The molar ratio of the total amount of the third structural unit and the fourth structural unit to the amount of the first structural unit is preferably not higher than 0.4:100, such as 0.39:100, 0.38:100, 0.37:100, 0.36:100, 0.35:100, 0.34:100, 0.33:100, 0.32:100, 0.31:100, 0.3:100, 0.29:100, 0.28:100, 0.27:100, 0.26:100, 0.25:100, 0.24:100, 0.23:100, 0.22:100, 0.21:100, 0.2:100, 0.19:100, 0.18:100, 0.17:100, 0.16:100, 0.15:100, 0.14:100, 0.13:100, 0.12:100, 0.11:100, 0.1:100, 0.09:100, 0.08:100, 0.07:100, 0.06:100, 0.05:100, 0.04:100, 0.03:100, 0.02:100, or 0.01:100. When the molar ratio of the total amount of the third structural unit and the fourth structural unit to the amount of the first structural unit is within the above range, the aliphatic polyester has better elongation.

1.5. Manufacture and Properties of Aliphatic Polyester

The aliphatic polyester of the present invention can be obtained by subjecting an aliphatic dicarboxylic acid, an aliphatic diol, a first cross-linking agent, and an optional second cross-linking agent to a condensation polymerization in the presence of a catalyst. In consideration of costs and convenience of process, the condensation polymerization is preferably performed in the absence of a solvent, i.e., without adding a solvent.

Examples of the above-mentioned catalyst include but are not limited to a compound containing a metal selected from the group consisting of titanium, germanium, zinc, aluminum, iron, magnesium, tin, antimony, manganese, cobalt, zirconium, vanadium, iridium, lanthanum, cerium, lithium, strontium, and calcium. Examples of the compound include but are not limited to carboxylic acid salts, alkoxy salts, sulfonic acid salts, oxides and halides that contain the above-mentioned metal. For example, the catalyst may be selected from the group consisting of tetra-n-propyl titanate, tetraisopropyl titanate, tetra-n-butyl titanate, tetra-tert-butyl titanate, tetracyclohexyl titanate, titanium lactate, triethanolamine titanate, butyl titanate dimer, titanium dioxide, and combinations thereof. In the appended examples, tetra-n-butyl titanate is used as the catalyst.

Based on the weight of aliphatic dicarboxylic acids, the content of the catalyst can range from 30 ppm to 2000 ppm, such as 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 1550 ppm, 1600 ppm, 1650 ppm, 1700 ppm, 1750 ppm, 1800 ppm, 1850 ppm, 1900 ppm, or 1950 ppm.

The detailed manufacturing method of the aliphatic polyester of the present invention are illustrated in the appended examples. Persons having ordinary skill in the art can accomplish the manufacturing of the aliphatic polyester of the present invention based on the specification, especially the appended examples, without undue experimentation. Therefore, the detailed description for the manufacturing method of the aliphatic polyester of the present invention is omitted here.

The present invention can provide an aliphatic polyester with one or more of the following excellent properties by means of using a specific cross-linking agent or cross-linking agent combination:
(i) a melt index (MI) ranging from 1 to 40, wherein the melt index is measured in accordance with ISO 1133 under a loading of 2.16 kg at 190° C.;
(ii) a melting temperature (Tm) ranging from 80° C. to 120° C.;
(iii) a tensile elongation of 185% or more;
(iv) a tensile strength of 35 MPa or more at the yield point, and a tensile strength of 25 MPa or more at the break point; and
(v) a YI value (which indicates clarity) of the aliphatic polyester is 10 or less, wherein the YI value is measured in accordance with ASTM D6290.

1.6. Applications of Aliphatic Polyester

The aliphatic polyester of the present invention can be formed into various molded products for every fields by means of any molding method known in the art. The molded products include but are not limited to films, laminated films, sheets, plates, stretched films, monofilaments, multifilaments, nonwoven fabrics, flat yarn, staples, crimped fibers, striped tapes, composite fibers, foams and injection molded articles. The aliphatic polyester of the present invention is useful in the fields of disposable packaging, disposable plastic straw, bio-degradable packaging, food container, disposable bio-degradable plastic bag, disposable tableware, outdoor cable tie, agricultural cable tie, agricultural packing plastic bag, cosmetics packaging, eco-friendly toy, water bottle (including but not limited to sport bottle), disposable fiber, and composted packing, but the present invention is not limited thereto.

2. EXAMPLES

2.1. Testing Methods

The present invention is further illustrated by the embodiments hereinafter, wherein the testing instruments and methods are as follows.

Melt Index (MI) Test

The melt index test is performed in accordance with ISO 1133. The instrument for the test is a melt index analyzer (model no.: LMI5000, available from Dynisco), and the testing conditions are as follows: 190° C.; and a loading of 2.16 kg.

Tensile Elongation Test

The tensile elongation test is performed in accordance with ISO 527, wherein the aliphatic polyester is formed to four pieces of test sample (molded product) and then subjected to the test. The instrument for the test is a tensile testing machine (model no.: 3367, available from Instron). The tensile elongation of the molded product of the aliphatic polyester is obtained by taking the average of the results of four tensile elongation tests.

Test of tensile strength at yield point and tensile strength at break point

The tensile strength at the yield point and the tensile strength at the break point are tested in accordance with ISO 527, wherein the aliphatic polyester is formed to four pieces of test sample (molded product) and then subjected to the test. The instrument for the test is a tensile testing machine (model no.: 3367, available from Instron). The tensile strength of the molded product of the aliphatic polyester is obtained by taking the average of the results of four tensile strength tests. The unit for tensile strength is MPa.

YI Value Test

The YI value test is performed in accordance with ASTM D6290, wherein the aliphatic polyester is formed to a cylinder pellet-type test sample with a diameter ranging from 2.5 mm to 2.8 mm and a height ranging from 3.2 mm to 3.5 mm and then subjected to the test. The instrument for the test is a color-difference meter (model no.: NE 4000, available from Nippon Denshoku; light source: D65/10).

Melting Temperature (Tm) Test

The melting temperature test is performed in accordance with ISO 11357. The instrument for the test is differential scanning calorimeter (model no.: Q200, available from TA Instruments).

2.2. List of Raw Materials Used in Examples and Comparative Examples

TABLE 1

| List of raw materials | |
|---|---|
| Model No. or name of raw material | Description |
| Succinic acid | Aliphatic dicarboxylic acid, available from Bio Amber |
| Adipic acid | Aliphatic dicarboxylic acid, available from Eastman |
| 1,4-butanediol | Aliphatic diol, available from Dairen Chemical Corporation (DCC) |
| Ethylene glycol | Aliphatic diol, available from Oriental Union Chemical Corporation |

TABLE 1-continued

List of raw materials

| Model No. or name of raw material | Description |
|---|---|
| Glycerol | Cross-linking agent with one secondary hydroxyl, available from Pan Asia Chemical |
| 1,2,4-butanetriol | Cross-linking agent with one secondary hydroxyl, available from Sigma-Aldrich |
| 2-methyl-1,2,3-propanetriol | Cross-linking agent with one tertiary hydroxyl, available from Sigma-Aldrich |
| 3-hydroxyglutaric acid | Cross-linking agent with one secondary hydroxyl, available from Sigma-Aldrich |
| Citramalic acid | Cross-linking agent with one tertiary hydroxyl, available from Sigma-Aldrich |
| Tartronic acid | Cross-linking agent with one secondary hydroxyl, available from Sigma-Aldrich |
| 3,18-dihydroxymethylenestearic acid | Cross-linking agent with one secondary hydroxyl, available from Sigma-Aldrich |
| 3-hydroxyoctadecanedioic acid | Cross-linking agent with one secondary hydroxyl, available from Sigma-Aldrich |
| Malic acid | Cross-linking agent with one secondary hydroxyl, available from Lynnbros Laboratories, Inc. |
| Trimesic acid (TMA) | Cross-linking agent without a secondary or tertiary hydroxyl, available from Sigma-Aldrich |
| Trimethylolpropane | Cross-linking agent without a secondary or tertiary hydroxyl, available from Chang Chun Plastics (CCP) |
| Pentaerythritol | Cross-linking agent without a secondary or tertiary hydroxyl, available from CCP |
| TBT | Catalyst, tetra-n-butyl titanate, available from Borica |

2.3. Manufacture and Properties of Aliphatic Polyester

The aliphatic polyester of Examples 1 to 20 and Comparative Examples 1 to 5 were manufactured according to the proportions shown in Tables 2-1 to 2-3. Specifically, a 3-liter reactor was equipped with a stirrer, a fractional condenser, a thermometer, and a gas inlet. The aliphatic diol, aliphatic dicarboxylic acid, first cross-linking agent, optional second cross-linking agent and TBT (the content of TBT is 1050 ppm with respect to the weight of the aliphatic dicarboxylic acid) were placed into the reactor, and nitrogen was introduced into the reactor to form a nitrogen atmosphere. Next, the reactor was heated to 230° C. to perform the reaction at that temperature for 5 hours. After that, the water in the reactor was removed by distillation. Then, the mixture in the reactor was reacted at 250° C. under vacuum for 90 minutes, and then the mixture was stirred at the same temperature to perform a polycondensation reaction for a period of time to obtain the aliphatic polyester. The stirring conditions are as follows: the rotation speed was 20 rpm, and the power was 0.3 kW to 0.5 kW. The melt index (MI) of the obtained aliphatic polyester measured under a loading of 2.16 kg at 190° C. ranges from 5 to 30. The time required for the polycondensation reaction are shown in Tables 2-1 to 2-3.

The melt index (MI), Tm, YI value, tensile elongation, tensile strength at the yield point of the aliphatic polyester and tensile strength at the break point of the aliphatic polyester of Examples 1 to 20 and Comparative Examples 1 to 5 were measured according to the aforementioned testing methods, and the results are listed in Tables 2-1 to 2-3.

TABLE 2-1

Composition and properties of aliphatic polyesters of Examples 1 to 10

| Unit: molar ratio | Example | | | | | | | | | |
|---|---|---|---|---|---|---|---|---|---|---|
|  | 1 | 2 | 3 | 4 | 5 | 6 | 7 | 8 | 9 | 10 |
| Succinic acid | 50 | 50 | 50 | 50 | 50 | 50 | 50 | 50 | 50 | 50 |
| 1,4-butanediol | 60 | 60 | 60 | 60 | 60 | 60 | 60 | 65 | 65 | 65 |
| Glycerol | 0.1 | 0.15 |  |  |  | 0.16 | 0.2 | 0.05 | 0.15 | 0.1 |
| 1,2,4-butanetriol |  |  | 0.1 |  |  |  |  |  |  |  |
| 2-methyl-1,2,3-propanetriol |  |  |  | 0.15 |  |  |  |  |  |  |
| 3-hydroxyglutaric acid |  |  |  |  | 0.18 |  |  |  |  |  |
| Malic acid |  |  |  |  |  |  |  | 0.15 | 0.05 | 0.05 |
| Time for polycondensation (unit: hour) | 5.1 | 4.5 | 5.5 | 6.8 | 4.8 | 4.6 | 4.1 | 3.8 | 3.9 | 3.7 |
| YI value | 2 | 2 | 2 | 3 | 7 | 2 | 1 | 4 | 2 | 3 |
| Tensile strength at yield point (unit: MPa) | 40 | 39 | 39 | 39 | 40 | 39 | 32 | 39 | 39 | 39 |
| Tensile strength at break point (unit: MPa) | 42 | 32 | 27 | 28 | 28 | 31 | 25 | 28 | 28 | 27 |
| Tensile elongation | 256% | 194% | 235% | 225% | 203% | 188% | 101% | 315% | 325% | 331% |
| MI | 30 | 30 | 30 | 30 | 30 | 30 | 30 | 30 | 30 | 30 |
| Tm (unit: ° C.) | 114 | 114 | 114 | 114 | 114 | 114 | 114 | 114 | 114 | 114 |

TABLE 2-2

Composition and properties of aliphatic polyesters of Examples 11 to 20

| Unit: molar ratio | Example | | | | | | | | | |
|---|---|---|---|---|---|---|---|---|---|---|
| | 11 | 12 | 13 | 14 | 15 | 16 | 17 | 18 | 19 | 20 |
| Succinic acid | 50 | 50 | 50 | 50 | 38 | 50 | 50 | 50 | 50 | 50 |
| Adipic acid | | | | | 12 | | | | | |
| 1,4-butanediol | 65 | 65 | 65 | 65 | 50 | 50 | 60 | 60 | 60 | 60 |
| Ethylene glycol | | | | | | 10 | | | | |
| Glycerol | 0.18 | 0.02 | 0.075 | | 0.075 | 0.15 | 0.075 | 0.075 | | |
| 2-methyl-1,2,3-propanetriol | | | 0.075 | 0.065 | | | | | | |
| Malic acid | 0.02 | 0.18 | | 0.065 | | | | | | |
| 1,2,4-butanetriol | | | | | 0.075 | 0.05 | | | | |
| Citramalic acid | | | | | | | 0.075 | | | |
| Tartronic acid | | | | | | | | 0.075 | | |
| 3,18-dihydroxymethylenestearic acid | | | | | | | | | 0.08 | 0.12 |
| 3-hydroxyoctadecanedioic acid | | | | | | | | | 0.08 | |
| Time for polycondensation (unit: hour) | 3.8 | 3.8 | 5.1 | 4.3 | 4.8 | 4.2 | 3.9 | 4.6 | 5.0 | 5.3 |
| YI value | 5 | 27 | 0 | 3 | 4 | 2 | 3 | 5 | 2 | 6 |
| Tensile strength at yield point (unit: MPa) | 40 | 40 | 39 | 40 | 39 | 39 | 39 | 39 | 38 | 39 |
| Tensile strength at break point (unit: MPa) | 32 | 28 | 28 | 28 | 28 | 28 | 27 | 28 | 26 | 27 |
| Tensile elongation | 135% | 180% | 336% | 340% | 615% | 425% | 331% | 329% | 352% | 236% |
| MI | 30 | 30 | 30 | 30 | 5 | 25 | 15 | 15 | 10 | 13 |
| Tm (unit: °C.) | 114 | 114 | 114 | 114 | 84 | 95 | 114 | 114 | 114 | 114 |

TABLE 2-3

Composition and properties of aliphatic polyesters of Comparative Examples 1 to 5

| Unit: molar ratio | Comparative Example | | | | |
|---|---|---|---|---|---|
| | 1 | 2 | 3 | 4 | 5 |
| Succinic acid | 50 | 50 | 50 | 50 | 50 |
| 1,4-butanediol | 60 | 60 | 60 | 65 | 75 |
| TMA | | 0.15 | | | |
| Trimethylolpropane | 0.15 | | | | |
| Pentaerythritol | | | 0.15 | | |
| Glycerol | | | | | |
| Malic acid | | | | 0.2 | |
| Time for polycondensation (unit: hour) | 4.3 | 4.1 | 2.6 | 4.8 | >12 |
| YI value | 3 | 4 | 1 | 30 | Not applicable |
| Tensile strength at yield point (unit: MPa) | 40 | 40 | 23 | 40 | Not applicable |
| Tensile strength at break point (unit: MPa) | 14 | 15 | 23 | 30 | Not applicable |
| Tensile elongation | 20% | 43% | 2.6% | 195% | Not applicable |
| MI | 30 | 30 | 5.6 | 30 | >300 |
| Tm (unit: °C.) | 114 | 114 | 114 | 114 | 114 |

As shown in Tables 2-1 to 2-3, the aliphatic polyester of the present invention exhibits excellent tensile elongation as well as satisfactory tensile strength, YI value and MI. The properties of the aliphatic polyester of the present invention are significantly superior to those of the aliphatic polyester that is not according to the present invention. In particular, Examples 1 to 6 and 20 show that when the first cross-linking agent is used alone in an amount that the molar ratio of the third structural unit to the first structural unit is less than 0.4:100, the aliphatic polyester of the present invention can have a tensile elongation of 188% or more and a YI of 7 or less. Examples 8 to 10 and 13 to 19 show that when the first cross-linking agent is used together with the second cross-linking agent in a proportion that the molar ratio of the third structural unit to the fourth structural unit ranges from 1:8 to 8:1, the aliphatic polyester of the present invention can have a tensile elongation of 315% or more and a YI of 5 or less.

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. An aliphatic polyester, which comprises:
   a first structural unit represented by

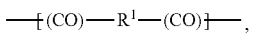

wherein $R^1$ is absent or a C1 to C40 aliphatic hydrocarbyl;
   a second structural unit represented by

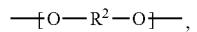

wherein $R^2$ is a C1 to C10 aliphatic hydrocarbyl;
   a third structural unit derived from a first cross-linking agent, wherein the first cross-linking agent has three reactive functional groups, wherein at least two of the reactive functional groups of the first cross-linking agent are hydroxyls, and at least one of the hydroxyls is a secondary or tertiary hydroxyl, with the proviso that the first cross-linking agent is not malic acid; and a fourth structural unit derived from a second cross-linking agent, wherein the second cross-linking agent has three reactive functional groups, wherein at least one reactive functional group of the second cross-linking agent is a secondary or tertiary hydroxyl, with the proviso that the second cross-linking agent is different from the first cross-linking agent, wherein the molar ratio of the third structural unit to the fourth structural unit ranges from 1:3 to 3:1, and the molar ratio of the total amount of the third structural unit and the fourth structural unit to the amount of the first structural unit is not more than 0.4:100, wherein the third structural unit is selected from the group consisting of

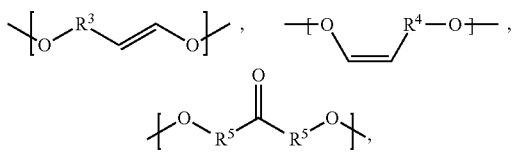

and combinations thereof, wherein $R^3$, $R^4$ and $R^5$ are independently a C1 to C10 aliphatic hydrocarbyl.

2. The aliphatic polyester of claim 1, wherein the second cross-linking agent is a C3 to C20 aliphatic alcohol or a C3 to C20 aliphatic alcohol acid.

3. The aliphatic polyester of claim 2, wherein the second cross-linking agent is selected from the group consisting of 1,2,4-butanetriol, 2-methyl-1,2,3-propanetriol, glycerol, 3-hydroxyglutaric acid, malic acid, citramalic acid, tartronic acid, 3,18-dihydroxymethylenestearic acid, 3-hydroxyoctadecanedioic acid, and combinations thereof.

4. The aliphatic polyester of claim 1, wherein the fourth structural unit is selected from the group consisting of

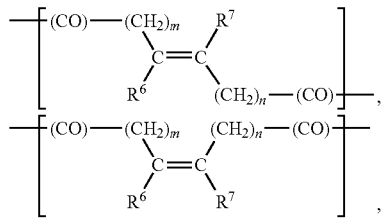

and a combination thereof, wherein m and n are independently an integer ranging from 0 to 18, and $R^6$ and $R^7$ are independently a hydrogen atom or a C1 to C18 aliphatic hydrocarbyl.

5. The aliphatic polyester of claim 1, wherein $R^1$ is absent or a C1 to C6 aliphatic hydrocarbyl, and $R^2$ is a C1 to C6 aliphatic hydrocarbyl.

6. The aliphatic polyester of claim 1, wherein:

the first structural unit is derived from succinic acid, adipic acid, oxalic acid, malonic acid, glutaric acid, octanedioic acid, decanedioic acid, dodecanedioic acid, C36 dimer acid, cyclohexanedicarboxylic acid, or any combination thereof; and the second structural unit is derived from ethylene glycol, 1,4-butanediol, neopentyl glycol, 1,6-hexanediol, 1,10-decanediol, 1,4-cyclohexanedimethanol, or any combination thereof.

* * * * *